United States Patent
Blackketter et al.

(10) Patent No.: US 6,415,438 B1
(45) Date of Patent: Jul. 2, 2002

(54) TRIGGER HAVING A TIME ATTRIBUTE

(75) Inventors: Dean J. Blackketter, San Francisco; Daniel J. Zigmond; Timothy F. Park, both of Menlo Park, all of CA (US)

(73) Assignee: WebTV Networks, Inc., Mountain View, CA (US)

(*) Notice: Subject to any disclaimer, the term of this patent is extended or adjusted under 35 U.S.C. 154(b) by 0 days.

(21) Appl. No.: 09/412,839

(22) Filed: Oct. 5, 1999

(51) Int. Cl.[7] .......................... H04N 7/16; H04N 7/10; H04N 7/025; H04N 5/445; G06F 3/00; G06F 13/00

(52) U.S. Cl. .......................... 725/136; 725/29; 725/32; 725/51; 725/146

(58) Field of Search .................. 348/1–3, 7, 10, 348/12–13, 553; 709/217–219, 232, 233, 235, 227–229, 207; 386/54; 380/200; 455/5.1; 725/13, 39, 110, 136, 29, 32, 51, 135, 139, 146

(56) References Cited

U.S. PATENT DOCUMENTS

| | | | |
|---|---|---|---|
| 5,485,553 A | * 1/1996 | Kovalick et al. | 358/1.6 |
| 5,752,159 A | * 5/1998 | Faust et al. | 725/13 |
| 5,818,935 A | * 10/1998 | Maa | 380/200 |
| 5,861,881 A | * 1/1999 | Freeman et al. | 707/500.1 |
| 5,864,823 A | * 1/1999 | Levitan | 705/14 |
| 5,931,908 A | * 8/1999 | Gerba et al. | 709/219 |
| 5,937,331 A | * 8/1999 | Kalluri et al. | 725/146 |
| 5,956,090 A | * 9/1999 | Yamauchi | 348/441 |
| 5,991,799 A | * 11/1999 | Yen et al. | 709/218 |
| 6,055,564 A | * 4/2000 | Phaal | 709/207 |
| 6,134,379 A | * 10/2000 | LaMacchia | 386/54 |
| 6,195,692 B1 | * 2/2001 | Hsu | 709/219 |
| 6,198,511 B1 | * 3/2001 | Matz et al. | 348/553 |
| 6,240,555 B1 | * 5/2001 | Shoff et al. | 725/110 |
| 6,256,785 B1 | * 7/2001 | Klappert et al. | 725/136 |
| 6,260,192 B1 | * 7/2001 | Rosin et al. | 725/39 |

FOREIGN PATENT DOCUMENTS

EP 0942595 A2 * 9/1999 ............ H04N/5/00

OTHER PUBLICATIONS

Advanced Television Enhancement Forum Specification (ATVEF); Copyright ATVEF, 1998, 1999, All Rights Reserved. Draft, Version 1.1r26 updated Feb. 2, 1999.*

U.S. application No. 09/295,746, Park et al., filed Apr. 20, 1999.

U.S. application No. 09/099,118, Zigmond et al., filed Jun. 17, 1998.

U.S. application No. 09/295,436, Zigmond et al., filed Apr. 20, 1999.

U.S. application No. 09/345,247, Leak et al., filed Jun. 30, 1999.

Electronic Industries Association EIA–746A, "Transport of Internet Uniform Resource Locator (URL) Information Using Text–2 (T–2) Service" (Sep. 1998).

Advanced Television Enhancement Forum Specification (ATVEF), Version 1.1 revision 26, (Feb. 2, 1999).

* cited by examiner

*Primary Examiner*—Andrew Faile
*Assistant Examiner*—Hai V. Tran
(74) *Attorney, Agent, or Firm*—Workman, Nydegger, Seeley (57) ABSTRACT

An interactive television trigger has a time attribute value that indicates a future time when the trigger is to be executed. In many situations, the trigger is sent to the receiver unit prior to the future time (e.g., to account for bandwidth limitations or to allow prefetching of an information resource associated with the trigger). Redundant triggers may be sent as the future time draws closer. In this way, if the receiver unit did not receive a previously sent trigger for some reason, a redundant trigger is available for execution. The receiver unit may ignore duplicate triggers. The time attribute value also may indicate a life span during which the trigger is valid so that, if a user switches video channels but returns to a video channel for which execution of the trigger is desired, the trigger may be re-executed during the life span.

24 Claims, 7 Drawing Sheets

TRIGGER HAVING A TIME ATTRIBUTE

BACKGROUND INFORMATION

Figure 1:
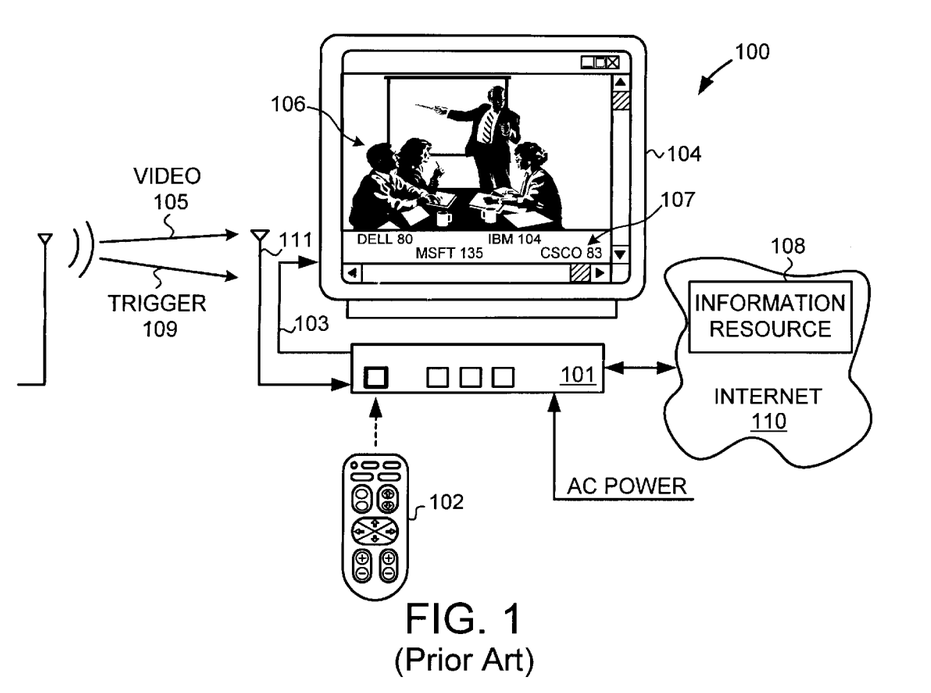
FIG. 1 (Prior Art) is a simplified diagram of an interactive television system 100.

FIG. 1 (Prior Art) is a simplified diagram of an interactive television system 100. System 100 includes a receiver unit 101, a receiving antenna 111, and a remote control unit 102. A viewer uses the remote control unit 102 to control the receiver unit 101 and/or to interact with interactive television content via the receiver unit 101. A video link 103 couples receiver unit 101 to an ordinary analog television set 104 so that the receiver unit can use the screen of the television set as a display device. The receiver unit 101 receives broadcast television video 105 on receiving antenna 111 and displays it as television video 106 on the screen of the television set 104.

In interactive television, information 107 from an information resource 108 is displayed along with television video 106 in a synchronized fashion. When the information 107 is to be displayed at a particular point in the television video, a communication called a "trigger" 109 is broadcast along with the television video 105 and is received on receiving antenna 111. Trigger 109 includes a Uniform Resource Identifier (URI) that identifies the information resource 108. Receiver unit 101 uses this URI to retrieve the information resource 108 from the Internet 110. Receiver unit 101 then displays the information 107 from the information resource 108 along with the television video 106 to provide an enhanced television viewing experience.

Each frame of the television video 106 includes two fields of 262.5 horizontal scan lines each in accordance with the National Television Standards Committee (NTSC) broadcast television format standard. The first twenty-one scan lines of each frame are commonly referred to as the "vertical blanking interval" (VBI lines). This interval is used to synchronize television receiver electronics and to return the electron beam of the television to the top of the screen among other things. The electron beam is therefore disabled (i.e. "blanked") during the scan time of the first twenty-one scan lines so that the electron beam does not scribe a visible line from the bottom of the screen to the top of the screen when it is being returned to the top of the screen. The entire vertical blanking interval is, however, generally not required for vertical synchronization and vertical beam retrace. Only VBI lines 1–9 of a field are generally required. The other twelve lines 10–21 of the field are therefore available for the communication of other information.

VBI line 21, for example, provides a low speed communication sub-channel. The Federal Communications Commission (FCC) mandates that part of this sub-channel be reserved for closed captioning services as specified by EIA-608. Text subtitles are encoded into this VBI line 21 sub-channel such that a television receiver that receives the signal can decode the information encoded into VBI line 21 and display it as a text subtitle along with the television video to assist the hearing impaired. Spare bandwidth available in this VBI line 21 sub-channel after the encoding of the closed captioning information may be used to transport the interactive television triggers such as trigger 109 to the receiver unit 101 at an appropriate time with respect to the broadcast television video 105.

Figure 2:
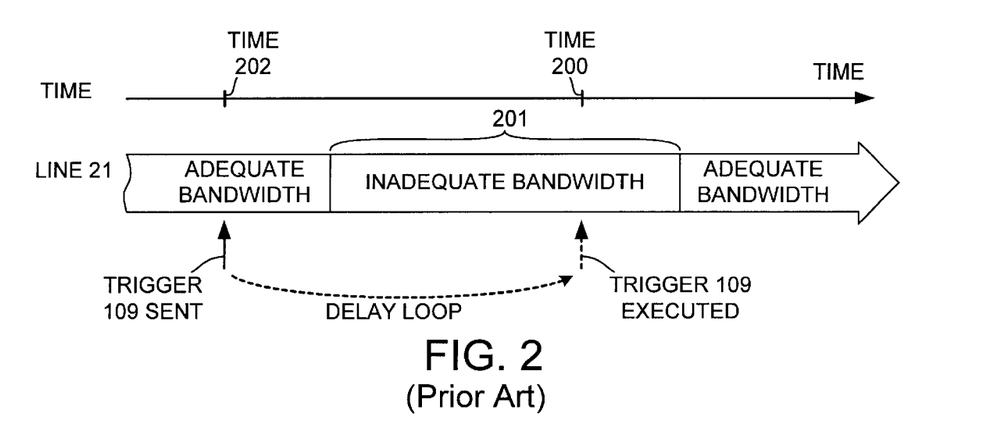
FIG. 2 (Prior Art) illustrates a problem that may be encountered when transmitting triggers to interactive television system 100.

FIG. 2 illustrates a problem associated with the use of the VBI line 21 sub-channel for the transport of trigger 109. Trigger 109 is desired to be transmitted to receiver unit 101 at time 200 with respect to broadcast television video 105. There is in this example, however, particularly heavy closed captioning use of the VBI line 21 sub-channel during period 201. Accordingly, there is not adequate bandwidth left for the communication of the trigger 109 at time 200.

A conventional method of solving this problem involves sending the trigger 109 beforehand (out of synchronization) with respect the point in the associated broadcast television video 105 where the trigger 109 is to be executed. In the example illustrated, trigger 109 is sent via the VBI line 21 sub-channel at time 202 before period 201. Receiver unit 101, rather than executing trigger 109 immediately upon receipt, executes a script on the information resource 108 to which the trigger 109 is addressed. The script involves a delay loop that delays the execution of trigger 109 until time 200.

The use of such a delay loop, however, introduces several complexities. The magnitude of the delay of such a delay loop is generally somewhat unrepeatable and difficult to control. The magnitude of the delay may, for example, vary from receiver unit to receiver unit due to hardware differences. The magnitude of the delay may also be affected by the particular software processes running on a receiver unit. Moreover, the coding required to realize such a delay loop involves effort on the part of the author of the interactive content and this is undesirable. Solutions to one or more of these problems are desired.

Moreover, in a current interactive television implementation, if trigger 109 executes in the context of a channel, and the viewer then changes channels to a different channel, and the viewer then changes channels back, the trigger is not reexecuted automatically. If, for example, trigger 109 initially caused stock ticker tape information 107 to be displayed along with video of a given channel, and if the viewer switched channels and then switched back, the stock ticker tape information 107 would not reappear because its trigger 109 would not automatically be reexecuted. A solution to this problem is also desired.

SUMMARY

In a first aspect of the invention, a trigger includes a time attribute indicative of a time in the future when the trigger is to be executed. Providing a time in the future when the trigger is to be executed allows the trigger to be sent in advance when there is adequate transport bandwidth to transport the trigger to the receiver unit. The receiver unit receives the trigger but knows from the future time attribute that the trigger is not to be executed yet, but rather is to be executed at the indicated future time. The receiver unit therefore waits until the indicated future time to execute the trigger. This future time attribute therefore eliminates the need for the script and delay loop described above.

In a second aspect of the invention, a trigger includes a time attribute indicative of a particular frame when the trigger is to be executed. In one embodiment, each frame of video is numbered with a frame number that is embedded in the video in accordance with a standard. The receiver unit monitors these frame numbers (or otherwise keeps track of the number of the current frame) and waits to execute the trigger until the frame identified by the time attribute of the trigger has been received. This future time attribute therefore eliminates the need for the script and delay loop described above.

In a third aspect of the invention, a receiver unit receives a trigger with an attribute indicating that the trigger is to be executed at some time in the future or some frame in the future. The receiver unit determines whether the receiver unit has enough time to retrieve an information resource identified by the trigger (this may involve establishing a connection to the Internet and retrieving the information resource from the Internet). If the receiver unit determines that there is enough time, then the receiver unit pre-fetches the information resource so that it is available at the future time or future frame when the trigger is to be executed. Triggers are therefore sent well before they are to be executed so that receiver units will pre-fetch associated information resources. Such pre-fetching is used in some embodiments to have receiver units access the Internet at off-peak (low cost) times and retrieve information resources needed for subsequent interactive television viewing at peak (high cost) times.

In a fourth aspect of the invention, multiple triggers to the same associated information resource on the Internet are all sent indicating the same future time or future frame for execution so that if a receiver unit for some reason does not receive the earlier triggers (the earlier triggers are provided to cause the receiver unit to prefetch the associated information resource), then the receiver unit will at least receive the last trigger and be able to execute it (this will generally require prompt retrieval of the associated information resource from the Internet).

In a fifth aspect of the invention, a trigger has a time attribute which provides a time up until which the trigger is valid for presentation (i.e., a "life span" for the trigger). Providing the life span time attribute allows a trigger to be executed in the context of a channel, allows the viewer to change channels and then change back, and allows the receiver unit automatically to reexecute the trigger if it is still valid (has not expired).

Future times of trigger execution, life span starting times and/or life span ending times can be expressed using multiple different characters and codes. Such times can be designated as absolute times and/or as relative times. Such times can be designated in terms of wall-clock time and/or media time base time. A receiver unit need not receive media encoded with time stamps in order to support media time base time attribute values, rather the receiver unit can keep track of the media time base by monitoring the progress of the media (for example, by maintaining a count of successive frames of video media as successive frames of the video media are received).

Triggers with time attributes can synchronize events with respect to information other than video. Triggers with time attributes can, for example, synchronize events with respect to audio. Such triggers can, for example, be transmitted via radio transmission along with audio information so as to synchronize events with respect to the audio as it is received by radio receiver units and/or to cause retrieval of information or prefetching of information by radio receiver units.

Other aspects of the invention and other embodiments are described in the detailed description below. This summary does not purport to define the invention. The invention is defined by the claims.

DETAILED DESCRIPTION

Figure 3:
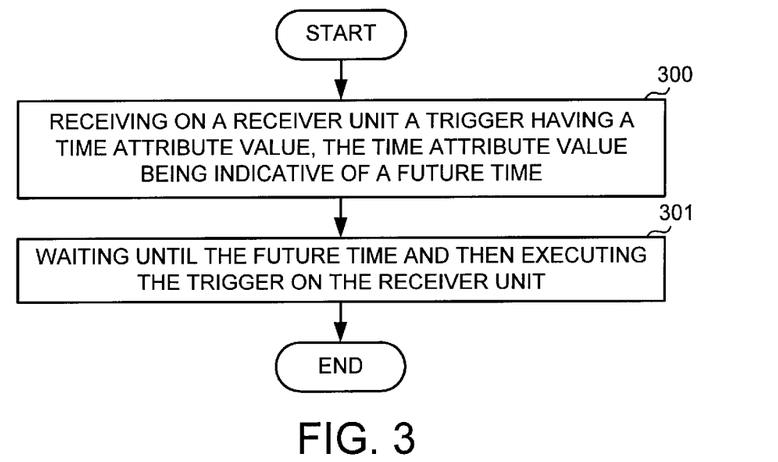
FIG. 3 is a flowchart of a method wherein a trigger has a time attribute value.

FIG. 3 is a flowchart of a method in accordance with one embodiment wherein a trigger (for example, trigger 400 in FIG. 4) has a time attribute value. The time attribute value is indicative of a future time. In a first step (step 300), the trigger having the time attribute is received on a receiver unit. In one embodiment, the receiver unit is a WebTV® set-top Internet Terminal as described in the following documents: U.S. patent application Ser. No. 09/099,118, entitled "Communicating Logic Addresses Of Resources In A Data Service Channel Of A Video Signal", filed Jun. 17, 1998, by Daniel J. Zigmond, et al.; U.S. patent application Ser. No. 09/295,746, entitled "Enabling And/Or Disabling Selected Types Of Broadcast Triggers", filed Apr. 20, 1999, by Park, et al.; and U.S. patent application Ser. No. 09/295,436, entitled "Receiving An Information Resource From The Internet If It Is Not Received From A Broadcast Channel", filed Apr. 20, 1999, by Zigmond, et al. (the content of these documents is incorporated herein by reference). The receiver unit may involve a television and Internet Terminal that are integrated together to constitute a single device. The receiver unit may also involve another type of receiver unit including a personal computer having a television tuner card such as the "Windows® 98 Broadcast PC" system. In some embodiments, the receiver unit includes a cable modem that couples the receiver unit to a cable (for example, a coaxial cable or a fiber optic cable).

The receiver unit determines the future time from the time attribute and waits (step 301) until the indicated future time. At the indicated future time, the receiver unit executes the trigger. Because the receiver unit determines the future time from the time attribute, the delay loops used to delay the execution of triggers described above are not needed.

Figures 4, 5, 6:
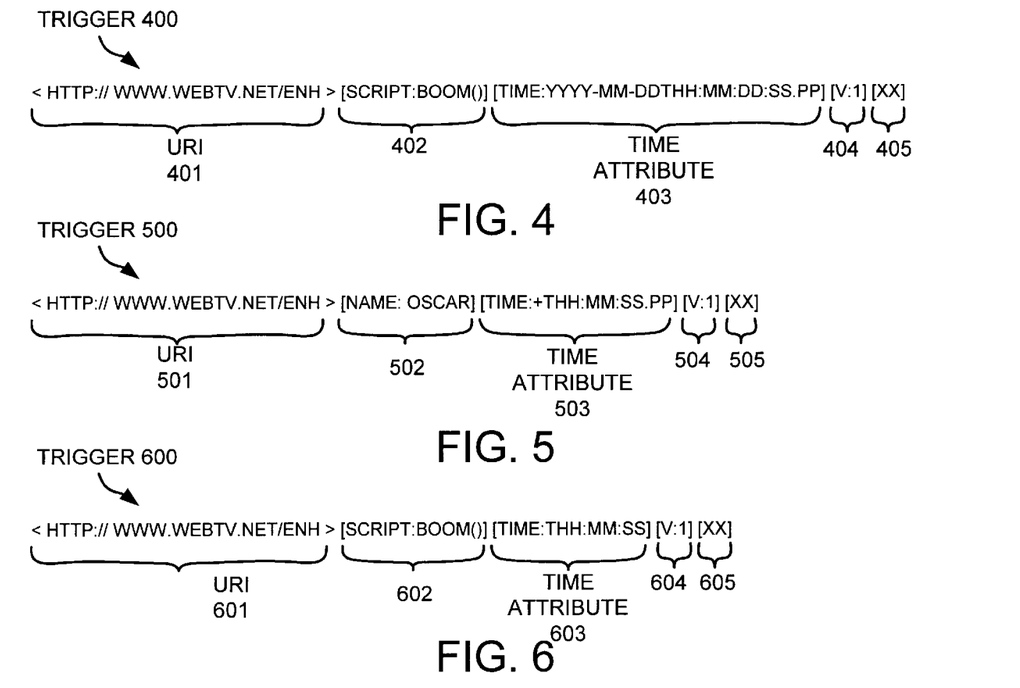
FIGS. 4, 5 and 6 illustrate diagrams of examples of triggers that have time attribute values and that are usable in the method of FIG. 3.

FIG. 4 is a diagram of an example of a trigger 400 usable in the method of FIG. 3. Trigger 400 includes a Uniform Resource Identifier (URI) 401, a script 402, a time attribute value 403 indicative of the future time, a version number 404 and a checksum 405. The general format of trigger 400 and methods of transporting trigger 400 to the receiver unit are set forth in: 1) Electronic Industries Association standard EIA-746A, and 2) Advanced Television Enhancement Forum Specification (ATVEF) Draft Version 1.1, revision 26 (the subject matter of these two documents is incorporated herein by reference).

The general format of dates in trigger 400 is set forth in International Organization for Standardization standard ISO-8601 (the subject matter of which is incorporated herein by reference). The YYYY digits of the time attribute value 403 indicate the year of the future time; the MM digits indicate the month; and the DD digits indicate the day. The "T" in the time attribute value 403 after the date indicates that the value 403 indicates a wall-clock date and time (as opposed to a media time base time). The HH digits in the time attribute value 403 indicate the hour of the future time; the MM digits indicate the month; the SS digits indicate the second; and the PP digits indicate the fraction of the second. The precision of fractional seconds is arbitrary. In this example, each second is broken into sixty parts. The values for PP in this example therefore range from 00 to 59.

The receiver unit maintains an indication of the current date and time (i.e., the current wall-clock time). The receiver unit may, for example, involve a real-time clock in either software or hardware that maintains the current date and time. In addition, or in the alternative, the current date and time can be periodically broadcasted to the receiver unit via a suitable mechanism. There are, for example, mechanisms for broadcasting time on XDS in analog television and there are other mechanisms for broadcasting time in digital television. These mechanisms can be used to communicate the current date and time to the receiver unit.

When the current wall-clock date and time as maintained by the receiver unit matches the future date and time indicated by the time attribute value 403, then the receiver unit executes the trigger 400. In the illustrated example, execution of the trigger involves execution of script "BOOM( )". Version number 404 indicates an ATVEF trigger standard version number with which trigger 400 comports.

FIG. 5 is a diagram of another example of a trigger 500 usable in the method of FIG. 3. Trigger 500 includes a URI 501, a name attribute value 502, a time attribute value 503, a version number 504 and a checksum 505. The "T" indicates that the time attribute value 503 indicates a time in terms of wall-clock time as opposed to a time in terms of a media time base such as a number of frames. In the example of FIG. 5, there is no date before the "T" so value 503 indicates the next occurrence of the time. The "+" in the time attribute value 503 means that the value 503 indicates a relative time (a relative time between the current wall-clock time and the future time when the trigger is to execute). Trigger 500 is therefore to be executed an "HH:MM:SS.PP" amount of time after the time when the trigger was received (i.e., from the current wall-clock time when the trigger was received). The receiver unit determines the passage of "HH:MM:SS.PP" using wall-clock time rather than using a media time base. At the future time, the name attribute 502 causes the name "OSCAR" to be displayed to the viewer.

FIG. 6 is a diagram of another example of a trigger 600 usable in the method of FIG. 2. Trigger 600 has a URI 601, a script 602, a time attribute 603, a version number 604, and a checksum 605. The time attribute does not, however, contain a date. Trigger 600 executes on the next occurrence of time "HH:MM:SS". The "T" indicates that the time "HH:MM:SS" is a wall-clock time as opposed to a media based time. In this example, time attribute value 603 does not contain a "PP" to designate a fraction of the second.

Figure 7:
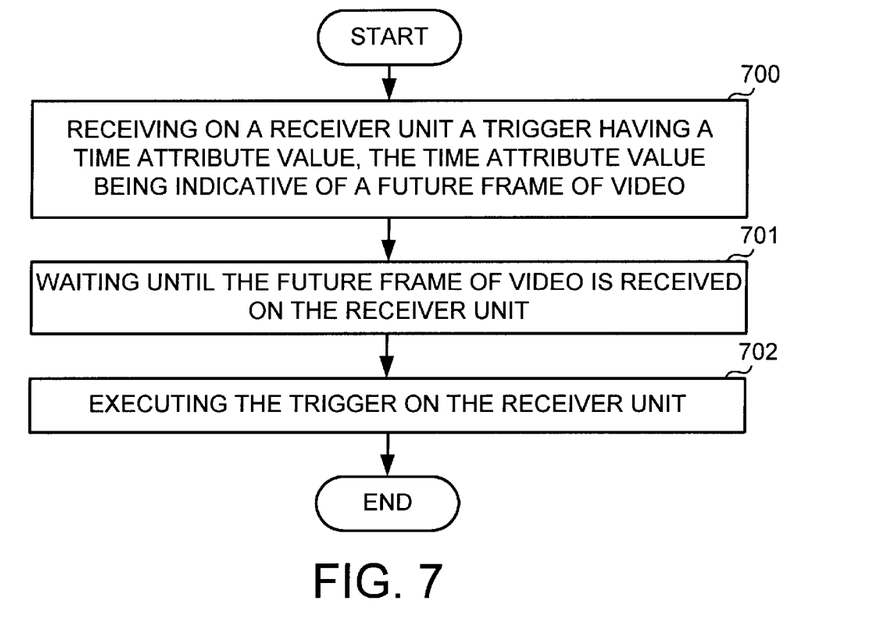
FIG. 7 is a flowchart of a method wherein a time attribute value indicates a future time by identifying a future frame of video.

FIG. 7 is a flowchart of a method in accordance with another embodiment wherein the future time indicated by the time attribute value of the trigger is indicated in terms of a media time base. In a first step (step 700), a trigger (for example, trigger 800 of FIG. 8) having a time attribute value is received on a receiver unit. The time attribute value indicates of a future frame of video.

Rather than immediately executing the trigger, the receiver unit waits (step 701) until the future frame indicated by the time attribute value has been received. When the future frame is received on the receiver unit, then the receiver unit executes the trigger (step 702).

Figure 8:
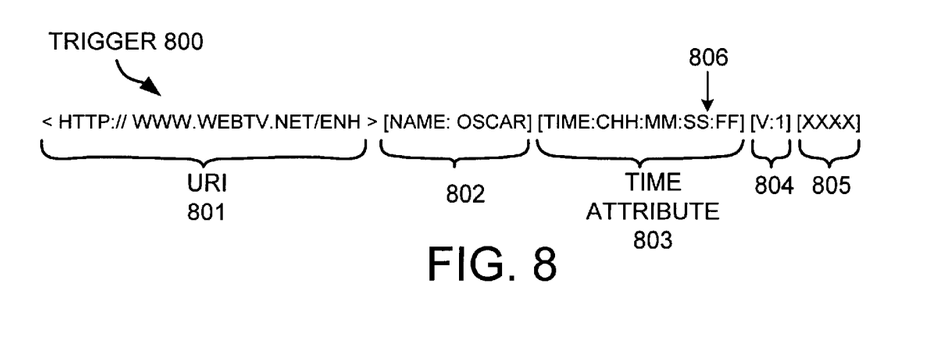
FIGS. 8 and 9 illustrate examples of triggers that have time attribute values that identify future frames of video and are usable in the method of FIG. 7.

FIG. 8 is a diagram of one example of a trigger 800 usable in the method of FIG. 7. Trigger 800 includes a URI 801, a name attribute 802, a time attribute value 803, a version number 804 and a checksum 805. Each frame of video in this example is encoded with a frame number such that each successive individual frame of video within a second has a frame number one integer larger than the previous frame. There are about thirty frames of video each second in an National Television Standards Committee (NTSC) video signal NTSC video frames are therefore numbered successively from 00 to 29 each second in accordance with the Society of Motion Picture and Television Engineers (SMPTE) 12M standard. The "C" in the time attribute 803 indicates that the value "HH:MM:SS:FF" indicates a future time in terms of a media time base (in this case, time attribute 803 identifies a particular frame) rather than in terms of wall-clock time. The "HH" digits indicate the hour of the frame; the "MM" digits indicate the minute of the frame; the "SS" digits indicate the second of the frame; and the "FF" digits indicate the number of the frame within the second. If the character 806 is a colon as it is in this example, then the time attribute value 803 is a drop frame code, whereas if character 806 is a semi-colon, then the time attribute value 803 is a non-drop frame code.

The time attribute value 803 in the example of FIG. 8 indicates the future time by referencing the frame number of a particular frame of video that will be received in the future. Generally the frames of a segment of video are numbered starting at "00:00:00:00". The receiver unit monitors the numbers of successively received video frames. When the receiver unit receives the frame indicated by the time attribute value 803, then the receiver unit executes the trigger 800. In the illustrated example, the name attribute 802 causes the name OSCAR to be displayed on the receiver unit. Version number 804 indicates an ATVEF trigger standard version number with which trigger 800 comports.

Figure 9:
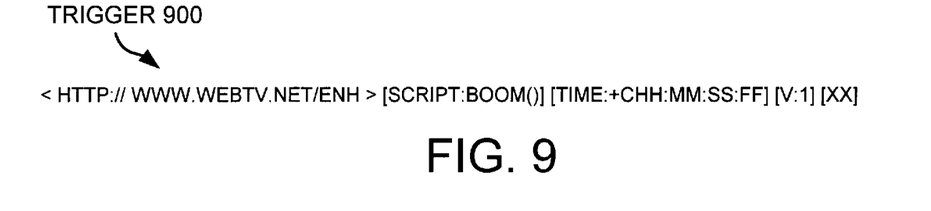

FIG. 9 is a diagram of another example of a trigger 900 usable in the method of FIG. 7. Trigger 900 is similar to trigger 800 of FIG. 8 in that the time attribute value identifies a future time in terms of media time base time as opposed to wall-clock time. Trigger 900 has a "+" indicating that the value of the time attribute is a relative value. Accordingly, trigger 900 is to be executed "HH:MM:SS:FF" frames from the current frame (the frame when trigger 900 was received on the receiver unit).

Figure 10:
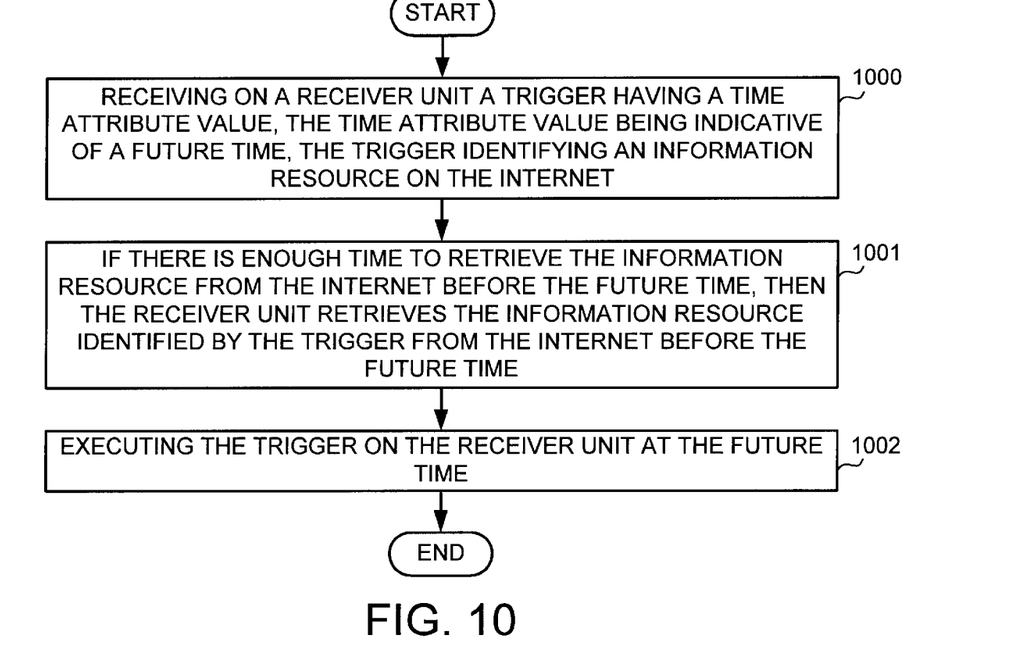
FIG. 10 is a flowchart of a method wherein a trigger having a time attribute value is transmitted well before it is to be executed so that a receiver unit can prefetch an information resource identified by the trigger before the trigger is executed.
Figure 11:
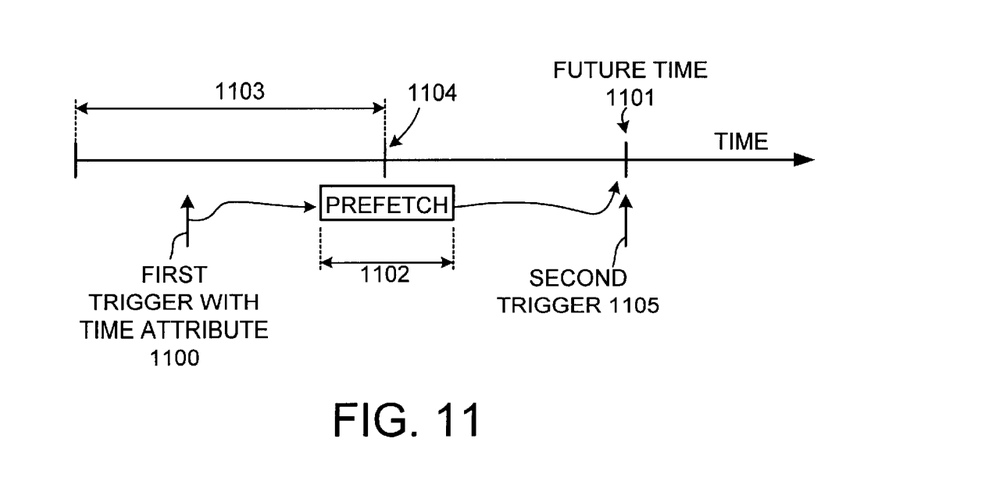
FIG. 11 is a diagram illustrating the method of FIG. 10.

FIG. 10 is a flowchart of a method in accordance with another embodiment. FIG. 11 is a diagram illustrating the method of FIG. 10. In this embodiment, a trigger 1100 that is to execute at a future time 1101 is sent early so that the receiver unit prefetches an information resource identified in the trigger. In a first step (step 1000), the trigger 1100 having a time attribute value is received on a receiver unit. The time attribute value indicates the future time 1101 when the trigger 1100 is to be executed. The trigger 1100 also identifies an information resource that should be available on the receiver unit when the trigger is executed. An example of such an information resources is web page content that is to be displayed on the receiver unit along with television video when the trigger is executed.

Next (step 1001), if there is enough time before future time 1101 for the receiver unit to retrieve the information resource from a remote information store (for example, from a server on the Internet), then the receiver unit retrieves (i.e. prefetches) the information resource from the remote information store. This prefetching occurs in FIG. 11 during time period 1102. Trigger 1100 in some embodiments has a URI that identifies the information resource on the Internet.

Once the information resource has been retrieved from the remote information store, then trigger 1100 is executed (step 1002) at future time 1101 indicated by the time attribute value of trigger 1100. In this way, receipt of trigger 1100 by the receiver unit causes the receiver unit to prefetch the information resource needed to execute the trigger so that the information resource is present on the receiver unit at future time 1101 when trigger 1100 is executed. This prefetching avoids the need to retrieve the information resource at the future time.

A time attribute value can be used to facilitate the prefetching of information by a relay station (such as a satellite uplink station) for subsequent insertion of the information into a signal being relayed by the relay station to receiver units. In some embodiments, only a selected type of information (for example, disconnected content) is prefetched and inserted as set forth in U.S. patent application Ser. No. 09/345,247, entitled "Interactive Television Triggers Having Connected Content/Disconnected Content Attribute", filed Jun. 30, 1999, by Leak, et al. (the subject matter of which is incorporated herein by reference). A trigger filter such as described in U.S. patent application Ser. No. 09/295,746, entitled "Enabling And/Or Disabling Selected Types Of Broadcast Triggers", filed Apr. 20, 1999, by Park, et al. can be employed to distinguish the selected type of trigger from other types of triggers (the subject matter of this application is incorporated herein by reference).

FIG. 11 also illustrates another embodiment in accordance with the present invention. Broadcasting trigger 1100 (hereinafter referred to as the first trigger) well before the future time 1101 when it is to be executed allows the prefetching of the associated information resource during time period 1102 as described above. If only first trigger 1100 were broadcast, however, then a receiver unit that was not receiving triggers during time period 1103 (for example, a receiver unit that was turned off during time period 1103 and was turned on at time 1104) would not receive the first trigger 1100. A viewer could be watching interactive television on the receiver unit after time 1104, but the enhancement that should have been provided by executing trigger 1100 would not be available as it should because trigger 1100 would not have been received.

In accordance with one embodiment of the invention, a second trigger 1105 for the same enhancement as first trigger 1100 is broadcast slightly before or at future time 1101. Accordingly, if a receiver unit does not receive first trigger 1100 because it was not receiving triggers up until time 1104, the receiver unit would nevertheless receive the second trigger 1105. Second trigger 1105 would then be executed despite the fact that first trigger 1100 was not received. Executing the second trigger 1105 would not provide for the prefetching of the information resource as would have been the case were first trigger 1100 received, but the receiver unit would still be able to retrieve the information resource at time 1101.

The receiver unit can distinguish first triggers from second triggers in one of many suitable ways. In one embodiment, a trigger is determined to be a second trigger if its URI is the same as the URI of an earlier received trigger that will be executed at a future time. If the receiver unit has already received a first trigger and then receives such a second trigger that has the same URI and identifies the same information resource, then the receiver unit may ignore the second trigger.

Figure 12:
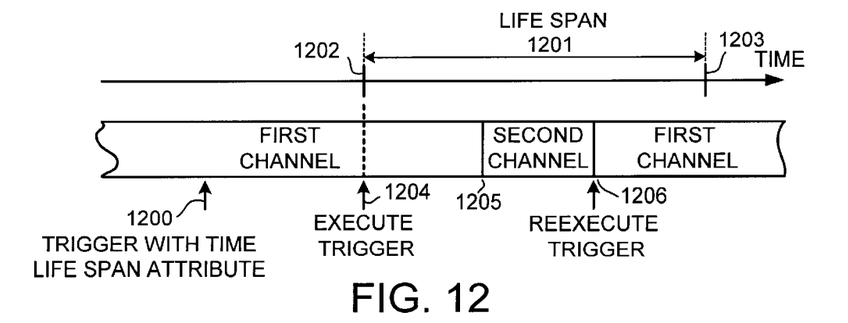
FIG. 12 illustrates an embodiment of the invention wherein a trigger has a time attribute value that indicates a life span for the trigger.
Figure 13:
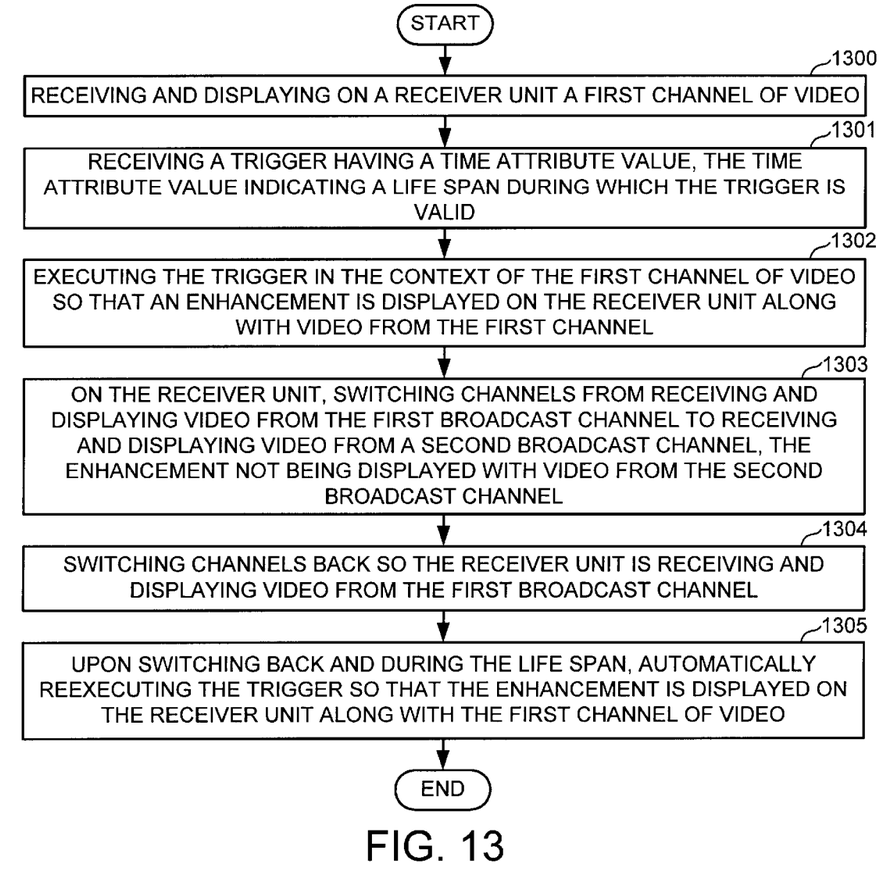
FIG. 13 is a flowchart of a method in accordance with the embodiment of FIG. 12.

FIG. 12 is a diagram that illustrates another embodiment in accordance with the invention. This embodiment involves a trigger that indicates a life span 1201 for the trigger. FIG. 13 is a flowchart illustrating a method in accordance with this embodiment. Initially (step 1300), video from a first broadcast channel is received and displayed on a receiver unit. Next (step 1301), a trigger 1200 having a time attribute value indicating a life span 1201 is received by the receiver unit. In FIG. 12, time progresses from left to right in the direction of the horizontally extending arrow labeled TIME. The vertically pointing arrow 1200 indicates the point in time on the arrow labeled TIME when the trigger 1200 is received. In one embodiment, trigger 1200 is encoded into VBI line 21 of a first channel of an NTSC broadcast signal. Trigger 1200 can, however, be communicated to the receiver unit via other transport mechanisms.

Figure 14:
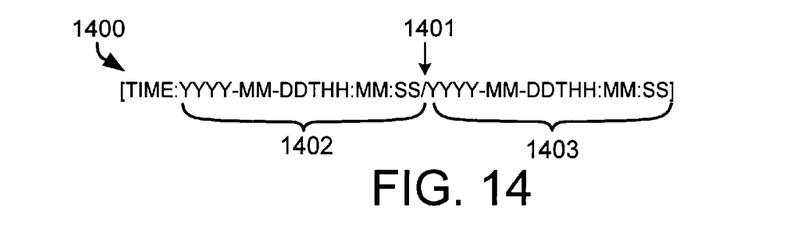
FIG. 14 illustrates an example of a time attribute value that indicates a life span of the trigger of FIG. 12.

FIG. 14 illustrates one possible time attribute value 1400 of trigger 1200. The "/" 1401 indicates that the time attribute value indicates a life span. The time value 1402 preceding the "/" indicates the starting time 1202 of the life span. The time value 1403 following the "/" indicates the ending time 1203 of the life span. The "Ts" in these values 1402 and 1403 indicate that these times are wall-clock times (as opposed to media time base times). The receiver unit does not immediately execute trigger 1200 because the current time is not within the life span 1201 indicated by time attribute value of trigger 1200.

Next (step 1302), at time 1202, the receiver unit determines that the current time is within the life span 1201 of trigger 1200. The trigger can be executed within life span 1201. In one embodiment, the receiver unit automatically executes trigger 1200 without further human input upon reaching time 1202. Execution of trigger 1200 is illustrated in FIG. 12 by arrow 1204.

In one embodiment, execution of trigger 1200 causes an icon to be displayed on the receiver unit. If a viewer selects the icon using a remote control unit of the receiver unit, then an enhancement is displayed on the receiver unit along with video from the first broadcast channel. Execution of trigger 1200 may, for example, entail retrieving an information resource identified by trigger 1200 from the Internet and displaying that information resource on the receiver unit.

Next (step 1303), the channel of video being displayed by the receiver unit is switched from the first channel to a second channel. When the channel of video is switched to the second channel, the enhancement is no longer displayed because the trigger 1200 is not associated with the second channel. The switching of channels from the first channel to the second channel is illustrated in FIG. 12 as occurring at time 1205.

After a period of time, the channel of video is switched back (step 1304) to first channel at time 1206 so that video from the first channel is again displayed on the receiver unit. Such a switching of channels from the first channel to the second channel and back to the first channel may be due to a viewer's perusing various channels.

If the time 1206 when the channel of video being displayed is switched back to the first channel is within life span 1201 of trigger 1200, then the trigger is valid for execution. In one embodiment, trigger 1200 is automatically reexecuted (step 1305) by the receiver unit so that the enhancement is displayed on the receiver unit along with the first channel video. In this way, a viewer can be viewing a first channel of video along with a particular enhancement, switch channels to another channel, and then return to the first channel of video such that the enhancement previously being viewed will be automatically displayed if the current time is still within the life span 1201 of the trigger.

Figure 15:
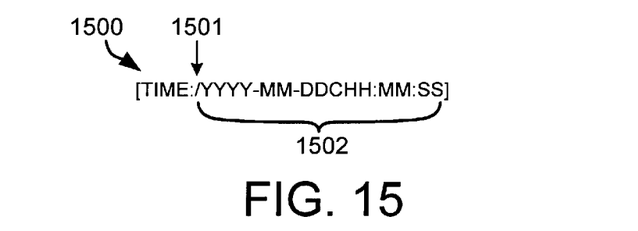
FIG. 15 is a diagram of a time attribute value that indicates a life span of a trigger where the life span starts when the trigger is received.
Figure 16:
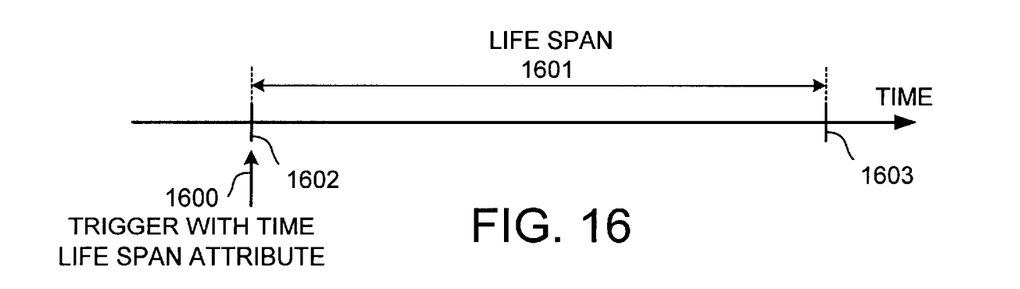
FIG. 16 is a simplified diagram illustrating the life span specified by the time attribute value of FIG. 15.

There are many ways that a time attribute value can indicate a life span. FIG. 15 illustrates a time attribute value 1500 that indicates a life span that starts when the receiver unit receives the trigger and ends at an absolute time (not a relative time). FIG. 16 is a diagram illustrating the life span 1601 indicated by the time attribute value 1500 of FIG. 15. In the example of FIG. 15, the absence of a value preceding the "/" character 1501 in the time attribute value 1500 indicates that the life span 1601 starts at the time 1602 when trigger 1600 is received. Life span 1601 ends at time 1603 indicated by the value 1502 that follows the "/" character 1501. Time value 1502 contains a "C" indicating that life span ending time 1603 is expressed in terms of a media time base (as opposed to wall-clock time). In one embodiment, each frame of the broadcast video is labeled with a frame number and the receiver unit monitors these frame numbers to determine when the frame designated by the time attribute value is received. In another embodiment, frames of the broadcast video are not labeled with frame numbers. Rather, the receiver unit keeps track of the current frame number by counting the passing of each successive frame as frames are received.

Rather than life span ending time 1603 being expressed in terms of a media time base as in the example of FIG. 15, life span ending time 1603 can be expressed in terms of a wall-clock time. In such a case, the "C" in the example of FIG. 15 is replaced with a "T". Time attribute value 1500 would then indicate a life span that starts when the receiver unit receives the trigger and that ends at a given wall-clock time.

Figure 17:
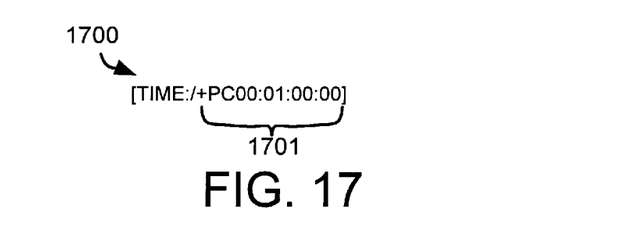
FIGS. 17, 18, 19 and 20 illustrate other examples of time attribute values that indicate life spans.

FIG. 17 illustrates another time attribute value 1700 that indicates a life span. The absence of a time value preceding the "/" character indicates that the life span starts when the trigger is received. The "+P" characters of time value 1701 mean that time value 1701 indicates a duration of time. The "C" in time value 1701 indicates that the duration is expressed in terms of a media time base (as opposed to wall-clock time). Time attribute value 1700 therefore indicates a life span of one minute of video, wherein the minute is measured in terms of the media time base, and wherein the life span starts at the time the trigger is received.

Figure 18:
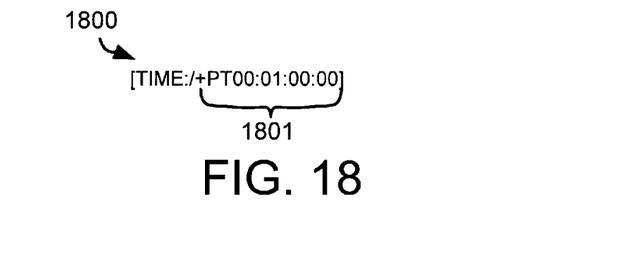

FIG. 18 illustrates a time attribute value 1800 that is similar to time attribute value 1700, except that the time value that indicates the duration of the life span does so in terms of an amount of wall-clock time (as opposed to an amount of time measured in the media time base). Time attribute value 1800 therefore indicates a life span of one minute of video, wherein the minute is measured in terms of wall-clock time, and wherein the life span starts at the time the trigger is received.

Figure 19:
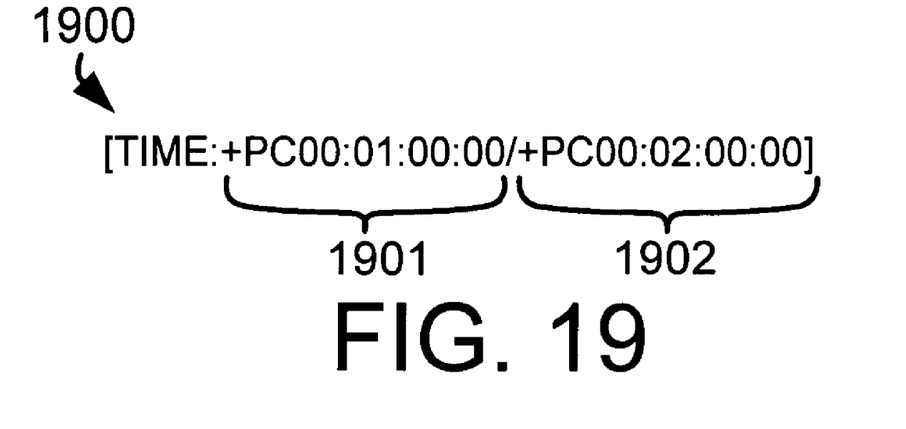

FIG. 19 illustrates a time attribute value 1900 that indicates a life span wherein the starting and ending times are expressed in terms of relative times. Both relative times are measured from the time of the trigger is received. Time value 1901 indicates that the life span starts at a time one minute of media from when the trigger is received. Time value 1902 indicates that the life span ends at a time two minutes from the time when the trigger is received. The one minute of media is measured in terms of a media time base as indicated by the "C" in time value 1901. The two minutes of media is measured in terms of a media time base as indicated by the "C" in ending value 1902.

Figure 20:
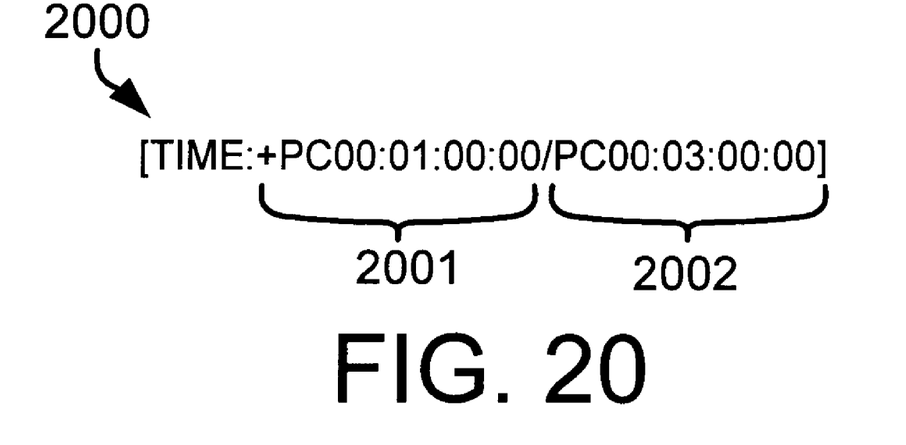

FIG. 20 illustrates a time attribute value 2000 that is similar to time attribute value 1900 except that the ending time value 2002 does not include the "+" character. The ending time value 2002 is therefore not relative to the time the trigger is received, but rather represents an amount of time relative to the starting time value 2001. The life span therefore starts at a time one minute of media from the time the trigger is received and extends from that time for a period of three minutes of media. Both the starting time and the three minutes of media are measured in terms of a media time base (as opposed to wall-clock time).

In accordance with one embodiment, a television program is tape-delayed or rebroadcast at a time when its triggers are no longer valid (i.e., expired). To prevent these invalid triggers from causing receiver unit failures or otherwise degrading the viewing of the television show at the time of the tape-delay or rebroadcast, the triggers of the television program include life span time attributes. The ending times of the life span attributes of these triggers are all before the time of the tape-delay or rebroadcast. Because the life spans of these triggers have all expired at the time of the tape-delay or rebroadcast, the receiver unit ignores these triggers that are no longer valid.

Although the present invention is described in connection with certain specific embodiments for instructional purposes, the present invention is not limited thereto. Time attribute values can employ characters and codes other than the specific characters and codes in the specific time attribute described above. The specific characters and codes used in the specific time attribute values described above are but one possible set of characters and codes. Other characters and codes may be employed. The various ones of the characters and codes used in the specific time attributes described above can be used together in various combinations to designate future times of trigger execution, life span starting times, and/or life span ending times. Such times can be designated in terms of wall-clock time and/or media time base time. Such times can be designated as absolute times and/or as relative times. Time zone information and different precision of times may be expressed in accordance with International Organization for Standardization standard ISO-8601 (the subject matter of which is incorporated herein by reference). Although the specific examples of time attributes described above all involve an attribute of the form [TIME:], the time attribute can have another forms in accordance with the invention. The time attribute need not be an attribute in accordance with EIA-746A. Application of triggers having time attribute values are not limited to the video context, but rather apply more broadly to triggers in general including the use of triggers in radio (both analog radio and digital radio). The triggers that do not synchronize events to either video or audio may nonetheless employ a time attribute in accordance with the present invention. A receiver unit need not receive media encoded with time stamps in order to support media time base time attribute values, rather a receiver unit can, for example, keep track of the media time base by monitoring the progress of the media (for example, by maintaining a count of successive frames of media as successive frames are received). Triggers having time attribute values can be communicated to receiver units by transports other than the VBI line 21 sub-channel. Broadcast television formats other than the NTSC format can be employed including: the Phase Alternate Lines (PAL) format, the Sequential Couleur Avec Memoire (SECAM) format, and the High Definition Television (HDTV) or digital television format. Triggers having time attribute values are not limited in application to solving bandwidth problems or to solving problems associated with having to retrieve information resources prior to trigger execution, but rather apply to the timing of execution of triggers in general.

Triggers having time attributes are not limited in application to situations where the triggers are received onto a receiver unit via a broadcast transmission, but rather apply to any situation where triggers are used including situations where video stored on a storage medium (for example, on an optical disc) is replayed and displayed on the receiver unit. In such a situation, the receiver unit is considered to be "receiving" the triggers and the video as the triggers and video are received onto the receiver unit from the storage medium. A panel is used, rather than an icon, to present possible interactivity to the user in some embodiments. Software that carries out steps of methods in accordance with the present invention can be stored on any computer-readable medium. Examples of computer-readable mediums include magnetic and optical storage media and semiconductor memory. Accordingly, various modifications, adaptations, and combinations of various features of the described embodiments can be practiced without departing from the scope of the invention as set forth in the claims.

What is claimed is:

1. In a computer network, which includes a plurality of servers and a plurality of interactive television receiver units, wherein the receiver units permit television sets to display content stored at the plurality of servers, and wherein the receiver units receive one or more triggers specifically designed for providing interactive content, a method of reliably and accurately executing a trigger at a desired time, the method comprising steps for:
   receiving at least one trigger which includes (i) a time attribute that indicates a future time and that is independent of user control, and (ii) an identifier for an information resource;
   determining, based on the time attribute when the at least one trigger should be executed;
   prefetching the information resource while waiting for the future time to arrive; and
   executing the trigger at the time indicated by the time attribute.

2. A method as recited in claim 1, further comprising a step for receiving one or more communication channels from a broadcaster, the one or more communication channels containing (i) broadcast content, and (ii) the at least one trigger.

3. A method as recited in claim 2, wherein the prefetching occurs during off-peak times.

4. A method as recited in claim 1, wherein the time attribute further indicates a life span for the at least one trigger, and wherein the at least one trigger corresponds to a first broadcast communication channel containing broadcast content, the method further comprising steps for:
   after executing the at least one trigger, switching channels from the first broadcast communication channel to a second broadcast communication channel, wherein the at least one trigger is not valid for execution in the context of the second broadcast communication channel;
   during the life span of the at least one trigger, switching channels back from the second broadcast communication channel to the first broadcast communication channel; and
   re-executing the at least one trigger.

5. A method as recited in claim 1, wherein the future time comprises a relative time indicating a period of time to wait prior to executing the at least one trigger.

6. A method as recited in claim 1, wherein the time attribute comprises a media-based time, the method further comprising a step for monitoring media received over the at least one broadcast communication channel to determine when the future time arrives.

7. A computer program product for use in a computer network, which includes a plurality of servers and a plurality of interactive television receiver units, wherein the receiver units permit television sets to display content stored at the plurality of servers, and wherein the receiver units receive one or more triggers specifically designed for providing interactive content, the computer program product comprising a computer readable medium carrying computer executable instructions that implement a method of reliably and accurately executing a trigger at a desired time, the method comprising steps for:
   receiving at least one trigger which includes (i) a time attribute that indicates a future time and that is independent of user control, and (ii) an identifier for an information resource;
   determining, based on the time attribute when the at least one trigger should be executed;
   prefetching the information resource while waiting for the future time to arrive; and
   executing the trigger at the time indicated by the time attribute.

8. A computer program product as recited in claim 7, the method further comprising a step for receiving one or more communication channels from a broadcaster, the one or more communication channels containing (i) broadcast content, and (ii) the at least one trigger.

9. A computer program product as recited in claim 8, wherein the prefetching occurs during off-peak times.

10. A computer program product as recited in claim 7, wherein the time attribute further indicates a life span for the at least one trigger, and wherein the at least one trigger corresponds to a first broadcast communication channel containing broadcast content, the method further comprising steps for:
   after executing the at least one trigger, switching channels from the first broadcast communication channel to a second broadcast communication channel, wherein the at least one trigger is not valid for execution in the context of the second broadcast communication channel;
   during the life span of the at least one trigger, switching channels back from the second broadcast communication channel to the first broadcast communication channel; and
   re-executing the at least one trigger.

11. A computer program product as recited in claim 7, wherein the future time comprises a relative time indicating a period of time to wait prior to executing the at least one trigger.

12. A computer program product as recited in claim 7, wherein the time attribute comprises a media-based time, the method further comprising a step for monitoring media received over the at least one broadcast communication channel to determine when the future time arrives.

13. In a computer network, which includes a plurality of servers and a plurality of interactive television receiver units, wherein the receiver units permit television sets to display content stored at the plurality of servers, and wherein the receiver units receive one or more triggers specifically designed for providing interactive content, a method of reliably and accurately executing a trigger at a desired time, the method comprising acts of:

for at least one trigger that comprises (i) a time attribute indicating a future time and independent of user control, and (ii) an identifier for an information resource, evaluating the time attribute to determine when the at least one trigger should be executed;

retrieving the information resource prior to the future time; and     executing the at least one trigger at the time indicated by the time attribute.

14. A method as recited in claim 13, further comprising an act of tuning to one or more communication channels from a broadcaster, the one or more communication channels containing (i) broadcast content, and (ii) the at least one trigger.

15. A method as recited in claim 14, wherein the retrieving occurs during off-peak times.

16. A method as recited in claim 13, wherein the time attribute indicates a life span for the at least one trigger, and wherein the at least one trigger corresponds to a first broadcast communication channel containing broadcast content, the method further comprising acts of:

after executing the at least one trigger while tuned to the first broadcast communication channel, tuning to a second broadcast communication channel, wherein the at least one trigger is not valid for execution in the context of the second broadcast communication channel;

during the life span of the at least one trigger, tuning back to the first broadcast communication channel; and     re-executing the at least one trigger.

17. A method as recited in claim 13, wherein the future time comprises a relative time indicating a period of time to wait prior to executing the at least one trigger.

18. A method as recited in claim 13, wherein the time attribute comprises a media-based time, the method further comprising an act of examining the frame numbers within the broadcast content if the broadcast content includes frame numbers, and otherwise, counting successive frames of the broadcast content as the frames are received.

19. A computer program product for use in a computer network, which includes a plurality of servers and a plurality of interactive television receiver units, wherein the receiver units permit television sets to display content stored at the plurality of servers, and wherein the receiver units receive one or more triggers specifically designed for providing interactive content, the computer program product carrying computer executable instructions that implement a method of reliably and accurately executing a trigger at a desired time, the method comprising acts of:

for at least one trigger that comprises (i) a time attribute indicating a future time and independent of user control, and (ii) an identifier for an information resource, evaluating the time attribute to determine when the at least one trigger should be executed;

retrieving the information resource prior to the future time; and     executing the at least one trigger at the time indicated by the time attribute.

20. A computer program product as recited in claim 19, the method further comprising an act of tuning to one or more communication channels from a broadcaster, the one or more communication channels containing (i) broadcast content, and (ii) the at least one trigger.

21. A computer program product as recited in claim 20, wherein the retrieving occurs during off-peak times.

22. A computer program product as recited in claim 19, wherein the time attribute indicates a life span for the at least one trigger, and wherein the at least one trigger corresponds to a first broadcast communication channel containing broadcast content, the method further comprising acts of:

after executing the at least one trigger while tuned to the first broadcast communication channel, tuning to a second broadcast communication channel, wherein the at least one trigger is not valid for execution in the context of the second broadcast communication channel;

during the life span of the at least one trigger, tuning back to the first broadcast communication channel; and     re-executing the at least one trigger.

23. A computer program product as recited in claim 19, wherein the future time comprises a relative time indicating a period of time to wait prior to executing the at least one trigger.

24. A computer program product as recited in claim 19, wherein the time attribute comprises a media-based time, the method further comprising an act of examining the frame numbers within the broadcast content if the broadcast content includes frame numbers, and otherwise, counting successive frames of the broadcast content as the frames are received.

\* \* \* \* \*

UNITED STATES PATENT AND TRADEMARK OFFICE
CERTIFICATE OF CORRECTION

PATENT NO.    : 6,415,438 B1
DATED         : July 2, 2002
INVENTOR(S)   : Dean J. Blackketter, Daniel J. Zigmond and Timothy F. Park It is certified that error appears in the above-identified patent and that said Letters Patent is hereby corrected as shown below:

Column 5,
Lines 12 and 17, after "indicate the" change "month;" to -- minute; --

Column 7,
Line 5, after "information" change "resources" to -- resource --

Column 10,
Line 4, after "time" delete "of"

Signed and Sealed this

Ninth Day of September, 2003

JAMES E. ROGAN
*Director of the United States Patent and Trademark Office*